No. 896,216. PATENTED AUG. 18, 1908.
L. KRIEGER.
ELECTRICALLY PROPELLED VEHICLE.
APPLICATION FILED JAN. 10, 1906.
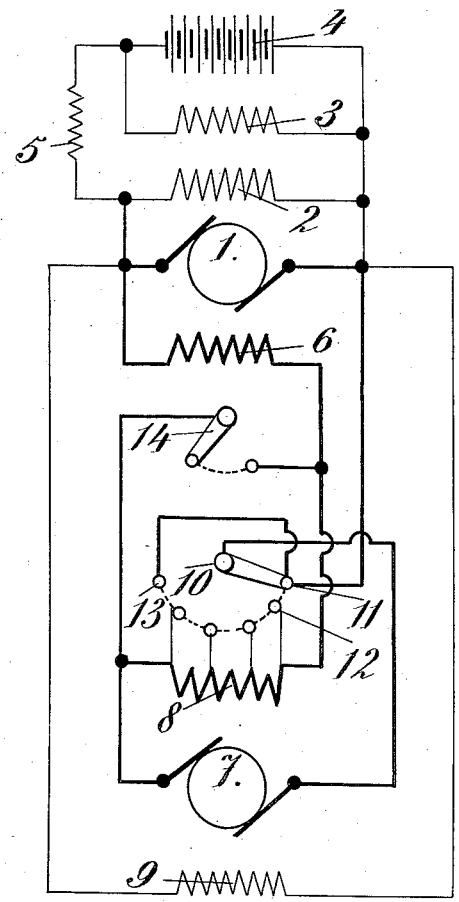

UNITED STATES PATENT OFFICE.

LOUIS KRIEGER, OF PARIS, FRANCE.

ELECTRICALLY-PROPELLED VEHICLE.

No. 896,216.

Specification of Letters Patent.

Patented Aug. 18, 1908.

Application filed January 10, 1906. Serial No. 295,400.

*To all whom it may concern:*

Be it known that I, LOUIS KRIEGER, of 45 Boulevard Haussmann, Paris, France, engineer, have invented a new and useful Improvement in Electrically - Propelled Vehicles, which improvement is fully set forth in the following specification.

In electric carriages fitted with a self regulating generator of constant watts it is necessary that the limits of self regulation be such that the variations of intensity in the armature winding of the generator should not attain a value capable of injuring this winding. It is therefore generally necessary under these conditions, having given great variations of the motor couple, necessitated by the road or starting requirements to make connections in the electric motors and to put them in series or in parallel or, in the case of a single motor, to make connections of the armature winding or of the field winding in such motor. In these circumstances, it is better to try to avoid these connections by using self-regulating motors, in order to allow to the latter the automatic variation of their couple within large limits for variations of the intensity in the generator.

Such is the object of this invention. One method of obtaining this result is to excite the motor or motors by two differential windings separate from each other; the one winding in series with the dynamo armature excites the motor in such a way that it rotates in the normal direction of working; the other winding, connected with brushes of the generator, excites the pole pieces in the opposite direction and tends to demagnetize them. In these circumstances, in the normal work demanded from the motor, in the level for instance, the difference of the two excitations is such that the motor acts under a predetermined number of ampere-turns and with a speed corresponding for example to the maximum speed if the engine gives its maximum power. On the other hand, when there is an incline, and consequently the motor couple must overcome a greater resisting couple, as the intensity of the current increases, the difference of potential at the terminals of the generator decreases and in consequence, the excitation of the motor increases, at first owing to the increase of the number of ampere-turns of the series winding and subsequently owing to the decrease of the number of ampere-turns of the demagnetizing winding, at the terminals of which the difference of potential is diminished, because it varies in inverse proportion to the intensity of the current in the series winding.

The total number of ampere-turns NI varies in fact in accordance with the formula $$f(I) = AI - \frac{B}{I},$$

in which A is the number of turns of the series winding, and B the number of turns of the demagnetizing winding; the coefficients A and B are chosen in such a manner that the value of $f(I)$ varies within well fixed limits and depends upon the construction of the motor for a predetermined variation of I. For example, let $i$ be the value of the intensity on the level, we have $$f(i) = Ai - \frac{B}{i},$$

$i$ being known beforehand, and fixed by the motor couple necessary for running on the level; let $i_1$ be the intensity which must not be exceeded, $i_1$ being greater than $i$, $f(i_1)$ is equal to the number of ampere-turns necessary to obtain the maximum couple on the greatest incline for which $i_1$ must not be exceeded. By writing the second equation $$f(i_1) = Ai_1 - \frac{B}{i_1},$$

the values of B and A are obtained; under these conditions the self-regulation of the motors is produced automatically within the limits within which it is desired to vary the intensities, limits which are exactly determined previously without having recourse for that end to any connections whatsoever.

The accompanying drawing illustrates by way of example, the circuits of such an arrangement.

1 is the armature of the generator; 2 the excitation in shunt of the generator; 3 the independent excitation of this generator; 4 the battery of accumulators assuring independent excitation; 5 the resistance allowing the recharge of the battery; 6 the demagnetizing excitation in series of the generator; 7 the armature of the motor; 8 the series excitation of the motor; 9 the demagnetizing excitation taken from the brushes of the generator.

This drawing makes it easy to follow the phenomena produced during the working of such an arrangement, under the conditions indicated in the first part of this description.

Further, on the circuit connecting one of the brushes of the generator to the brushes of the armature of the motor, is placed a switch 10 which establishes the continuity of the circuit by the contact 11 for forward working. For the working of the electric brake, the switch 10 first interrupts this circuit by leaving the contact 11, then by making contact at 12, short circuits the series arrangement (armature 7 and winding 8) of the motor, next gradually cuts out the series winding 8, in such a way as to increase the action of the brake and finally, on contact 13, reëstablishes the circuit in the armature of the motor, after having short-circuited the series winding of the latter by the switch 14 which finally reverses the running. In fact, under these conditions, as the field produced by the winding taken from the brushes of the generator is opposite to the normal field for the normal working, the motor begins to turn in the direction opposite to the direction corresponding to forward working.

Having thus fully described my invention, what I claim is:—

1. The combination, with a generator of constant watts, of a motor arranged to be energized by said generator, said motor having a demagnetizing winding also energized by said generator.

2. The combination, with a generator of constant watts, of a motor having armature and field-windings energized by said generator and having an independent demagnetizing winding connected to said generator in parallel with the motor armature and field windings.

3. The combination, with a generator of constant watts, of a motor having armature and field windings in series, and arranged to be energized by said generator, a demagnetizing winding for the motor arranged in parallel with the motor armature and field winding, and means for short circuiting the motor armature and field windings.

4. The combination, with a generator of constant watts, of a motor having armature and field windings arranged to be energized by said generator, a demagnetizing winding for the motor arranged in parallel with the motor armature and field windings, and means for progressively cutting out the field winding of the motor.

5. The combination, with a generator and a motor arranged to be energized thereby, said motor having a main field winding and an opposing field winding, of means for progressively cutting out the main field winding, whereby the current through the opposing field winding will cause a reversal of the motor.

6. The combination, with a generator of constant watts, and a motor having armature and main field windings arranged in series and connected to said generator, of an opposing field winding for said motor arranged in parallel with the armature and field windings, and means for cutting out the main field windings progressively.

7. The combination, with a generator of constant watts, of a motor having armature and field windings in series and arranged to be energized by the generator, and an independent demagnetizing winding for the motor connected to the generator, the constants of the field and demagnetizing windings of the motor being such that the current in the generator armature is limited to a fixed maximum, irrespective of the torque of the motor.

In testimony whereof I have signed this specification in the presence of two subscribing witnesses.

LOUIS KRIEGER.

Witnesses:
HANSON C. COXE,
GASTON DE MESTRAL.